UNITED STATES PATENT OFFICE.

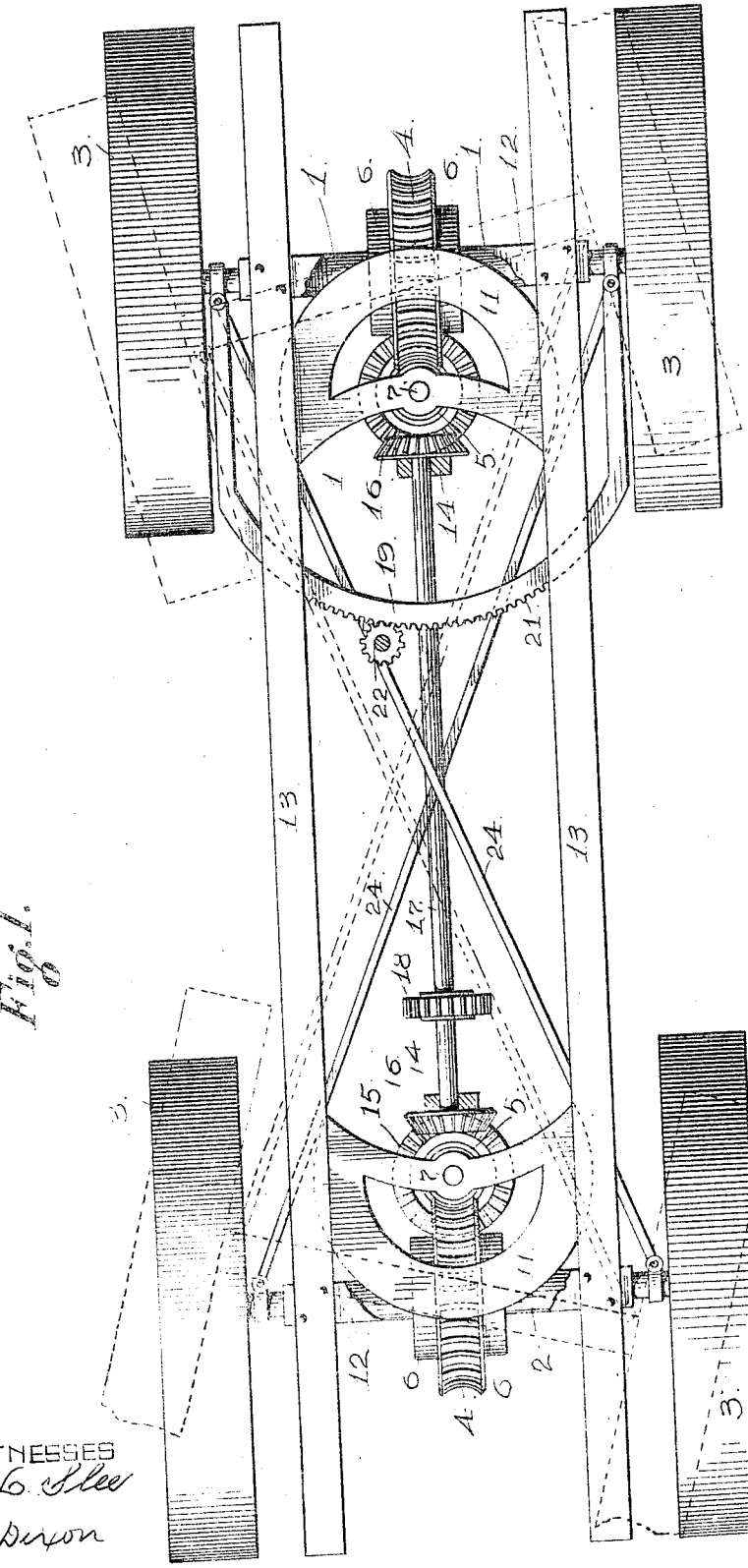

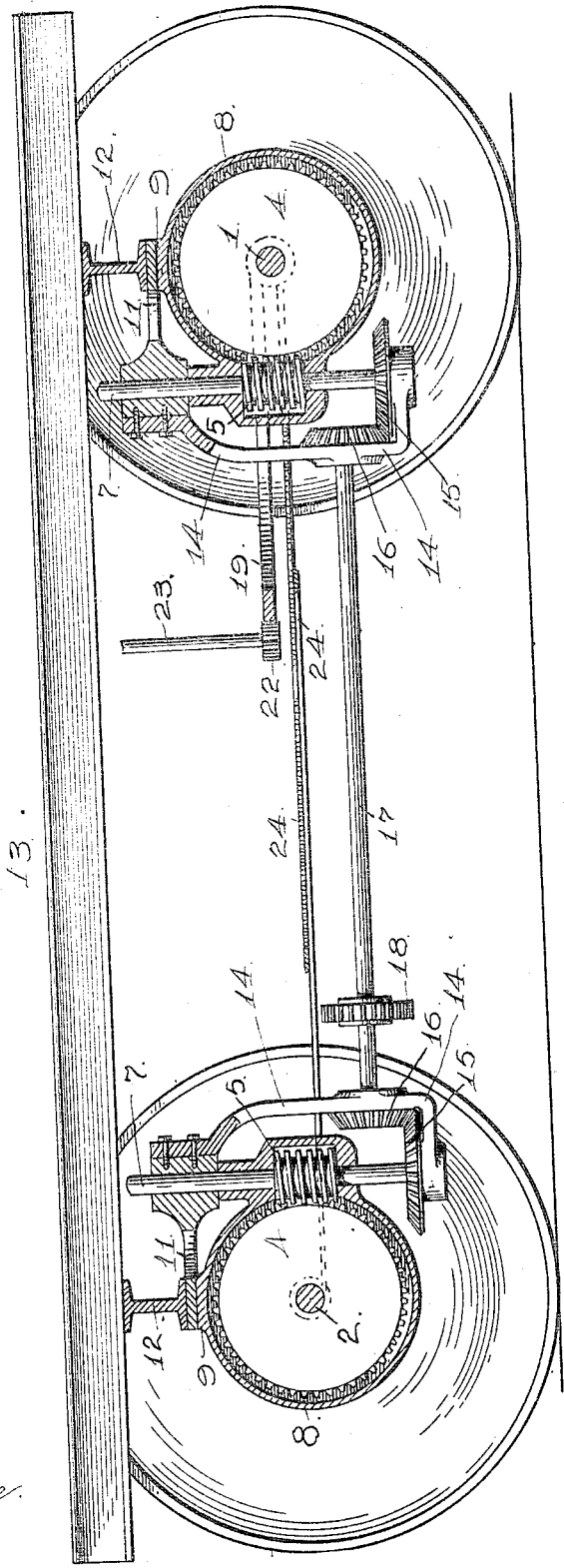

RAFORD W. PETERSON AND ALEXANDER SCHELLING, OF SANTA ROSA, CALIFORNIA; SAID SCHELLING ASSIGNOR TO SAID PETERSON.

TRANSMISSION AND STEERING MECHANISM FOR TRACTION-ENGINES.

971,471.  Specification of Letters Patent.  Patented Sept. 27, 1910.

Application filed February 19, 1909. Serial No. 478,983.

*To all whom it may concern:*

Be it known that we, RAFORD W. PETERSON and ALEXANDER SCHELLING, citizens of the United States, residing at Santa Rosa, in the county of Sonoma and State of California, have invented new and useful Improvements in Transmission and Steering Mechanism for Traction-Engines, of which the following is a specification.

Our invention relates to improvements in driving and steering mechanism for traction engines, and particularly to that class of traction engines wherein a maximum of tractive power is required with a minimum of weight of the traction engine, and wherein a traction engine is required that can be readily turned and maneuvered in a small space.

We aim, in our invention, to provide a means whereby all of the four wheels on which the engine rests are made driving, or traction, wheels. Also by our invention we aim to provide a means whereby all four of the wheels on which the engine rests, as well as being driving, or traction, wheels, are steering wheels, so that the engine can be readily turned or maneuvered.

It will be seen from the description herein given, that a traction engine constructed with driving and steering mechanism, in accordance with our invention, will be of great benefit to agriculturists, and it is particularly designed for use for agricultural purposes, though it will be apparent that it is adapted to many, and all, uses where traction engines are employed.

All of these objects, and other objects more particularly set forth in this specification and appended claim, are secured by our invention, an embodiment of which is shown in the accompanying drawings, and in which drawings:

Figure 1 is a plan view with the gear casing removed, and Fig. 2 is a longitudinal section.

Referring more particularly to the drawings the numerals 1 and 2 indicate axles on which are mounted the driving, or traction wheels 3. On each of the axles 1 and 2 are the gear wheels 4 in mesh with the worm gears 5. Also on each of these axles 1 and 2 are mounted the differential gearings which we have indicated in the casings at 6. These differential gearings may be any one of the many well known types of such gearings, and so provided, and so adapted, that each of the said traction wheels 3 will operate independently of the other traction wheel on the same axle. The worm gears 5 are rigidly mounted on the shafts 7. Loosely mounted on the said shafts 7 are the pieces 8 which serve as casings for the gear wheels 4, and the worm gears 5, and in which casings are rotatably mounted the axles 1 and 2. On the upper part of the pieces, or casings, 8 are the pieces 9 with smooth upper surfaces which engage parts 11, said parts 9 and 11 forming the fifth wheels of the vehicle. The parts 11 are rigidly secured to the bolsters 12 of the platform frame 13. The shafts 7 serve as king-bolts for these fifth-wheels. Secured to the stationary parts 11 of the fifth-wheels are the supports 14 so designed to serve as mountings for the shaft 17. On the shafts 7 are the beveled geared wheels 15 in mesh with the beveled geared wheels 16 on the driving shaft 17. On this driving shaft 17 we have shown a cog wheel 18 as a means of receiving power from any suitable source, or driving mechanism, that may be desired, and which source, or driving mechanism, may be suitably mounted on the platform frame 13. The worm gears 5 and the geared wheels 4 are so provided that with whatever direction of motion imparted to the driving shaft 17 the traction wheels 3 will each turn in one and the same direction according to the direction given to the driving shaft.

As a means of steering a traction engine constructed with all four wheels on which the engine rests acting as traction, or driving, wheels as hereinbefore described, we desire the use of a specially designed device as productive of the best results of our invention. On one of the casings in which one of the axles is rotatably mounted we secure, in any convenient manner, a segment 19, of any suitable material. We have shown this segment secured to the casing in which is mounted axle 1. On the circumference of this segment 19 is the toothed gear 21 which is in mesh with the geared pinion 22 on the shaft 23. The shaft 23 is suitably mounted in any convenient manner on the frame 13. By turning the pinion 22 it will be seen that the axle 1 can be turned to an angle, as desired, from a right angle to the plane of the vehicle. Connecting the casings in which are mounted the axles 1 and 2 are the rods 24. One end of each rod is pivotally connected to the casing in which axle 1 is mounted at a point away from the center of said casing. We have shown the ends of these rods connected to the casing close to the outer ends of the said casing where the axle protrudes and close to the mounting of the traction wheels 3. The other ends of the rods 24 are pivotally connected to the casing in which axle 2 is mounted also at points away from the center of said casing and close to its outer ends, in like manner as the rods are connected to the casing in which axle 1 is mounted. Each rod, however, is connected at points on the casing in which axle 2 is mounted diagonally opposite to the points respectively to the points of connection on the casing in which axle 1 is mounted. These rods will thus cross each other and it will be seen that should axle 1 be moved away from a right angle to the plane of the vehicle the connecting rods 24 will cause axle 2 to be moved in direction opposite to that of axle 1, but at a corresponding angle from a right angle to the plane of the vehicle assumed by axle 1, or the position indicated by the dotted lines in Fig. 1. With the traction wheels in the position as we have indicated by the dotted lines, it will be seen that, assuming that axle 1 is at the forward part of the vehicle as it travels, the vehicle can be turned in a very small space and can be readily and easily maneuvered.

It will also be seen that we can, by disconnecting the ends of the rods 24 from the casing in which axle 1 is mounted and by securing the said ends of the rods to the platform frame 13 in any convenient manner so as to secure the casing in which axle 2 is mounted at a right angle to the plane of the vehicle, change the engine to one that can be steered by the one pair of traction wheels on the axle 1. We desire this modification as a means to increase the operative efficiency of our invention in such cases where long hauls may be required, as over country roads, and where rapid maneuvering in small spaces is not desired.

Although we have shown what we consider a very desirable form of mechanism for embodying our invention, it is evident that changes and alterations in the form and arrangement of the parts may be made without departing from the spirit of the invention, and we reserve the right to make such changes as will come within the scope of the invention as is embodied in the appended claim.

Having thus described our invention, what we claim as new and desire to secure by Letters Patent is:

A driving and steering mechanism for traction engines comprising front and rear axles, a pair of wheels carried by each axle, a gear wheel 4, carried by each axle, means for independently driving each wheel of each pair from the gear wheel 4, a front and rear frame carried by the vehicle and having vertical bearings therein, an upright shaft mounted in said bearings, a worm on each shaft gearing with the gear wheel 4, a horizontal shaft 17, a gear wheel thereon adapted to be connected with the motor power, a gear wheel on the lower end of each vertical shaft, gear wheels on the horizontal shaft 17 meshing therewith, and a casing inclosing each gear wheel 4 and supported by the vertical shaft.

In testimony whereof we have affixed our signatures in the presence of two witnesses, this 6th day of February, 1909.

RAFORD W. PETERSON.
ALEXANDER SCHELLING.

Witnesses:
FRANK L. OWEN,
A. DIXON.